(12) United States Patent
Ranguelova

(10) Patent No.: US 8,655,080 B2
(45) Date of Patent: Feb. 18, 2014

(54) METHOD AND APPARATUS FOR IDENTIFYING COMBINATIONS OF MATCHING REGIONS IN IMAGES

(75) Inventor: Elena Boykova Ranguelova, Amsterdam (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 331 days.

(21) Appl. No.: 13/141,372

(22) PCT Filed: Dec. 22, 2009

(86) PCT No.: PCT/NL2009/050794
§ 371 (c)(1),
(2), (4) Date: Sep. 7, 2011

(87) PCT Pub. No.: WO2010/074571
PCT Pub. Date: Jul. 1, 2010

(65) Prior Publication Data
US 2011/0311148 A1    Dec. 22, 2011

(30) Foreign Application Priority Data

Dec. 22, 2008 (EP) .................................. 08172642

(51) Int. Cl.
*G06K 9/46* (2006.01)
*G06K 9/66* (2006.01)
(52) U.S. Cl.
USPC .......................................... 382/203; 382/197
(58) Field of Classification Search
None
See application file for complete search history.

(56) References Cited

U.S. PATENT DOCUMENTS 7,508,998 B2 * 3/2009 Shiiyama .................... 382/305
2009/0290798 A1 * 11/2009 Sakai et al. .................. 382/195

OTHER PUBLICATIONS

Wang et al, "Constraint Based Region Matching for Image Retrieval," 2004, International Journal of Computer Vision 56(1/2), pp. 37-45.*
Carson et al, "Region-Based Image Querying," 1997, Content-Based Access of Image and Video Libraries, Proceedings, IEEE Workshop on, pp. 42-49.*
Deng et al, "Reinforcement Matching Using Region Context," 2006, CVPRW 06, Conference on Jun. 17-22, 2006, pp. 1-8.*

(Continued)

*Primary Examiner* — Brian P Werner
*Assistant Examiner* — David F Dunphy
(74) *Attorney, Agent, or Firm* — Waddey & Patterson, P.C.; Rebecca M. Barnett

(57) ABSTRACT

Matching combinations of regions are identified in a first and second image of a common scene. First and second sets of image regions are first identified in the first and second image on their own. Next a search is made for potentially matching first and second regions from the first and second set. First and second geometrical parameters such as moments are computed, which provide a first order approximation of the shapes of the first and second region respectively, in terms of the size and directions of major and minor axes of ellipses. These first and second geometrical parameters may be considered to define a first and second normalizing map, which map the first and second regions to isotropic regions, wherein the ellipses become circles. A search is made for closest third and fourth regions in the first and second image with matching distances to the first and second regions in spaces obtainable by mapping locations in the first and second image according to the first and second normalizing maps. The match is verified when such matching closest regions are found.

12 Claims, 4 Drawing Sheets

(56) References Cited

OTHER PUBLICATIONS

E. Ranguelova et al: "Morphology-based Stable Salient Regions Detector" in Center for Mathematics and Computer Science (CWI), Amsterdam 1098 SJ, The Netherlands, Jan. 1, 2006,conference paper, XP002540172.

Jianhua Zhang et al: "Normalized weighted shape context and its application in feature-based matching" in Optical Engineering, Sep. 9, 2008, vol. 47. XP002540168.

Eli Saber et al: "Region-Based Shape Matching for Automatic Image Annotation and Query-by-Example" Journal of Visual Communication and Image Representation, vol. 8, No. 1, pp. 3-20, Mar. 1997, Article No. VC970344, XP002540169.

Desire Sidibe et al: "Matching Local Invariant Features with Contextual Information: An Experimental Evaluation" Electronic Letters on Computer Vision and Image Analysis 7(I):26-39, Mar. 2008, XP002540170.

Elena Ranguelova et al: "Saliency Detection and Matching for Photo-Identification of Humpback Whales" in Center for Mathematics and Computer Science (CWI), Kruislaan 413, 1098 SJ Amsterdam, The Netherlands, Mar. 2006. XP002540171.

Gustavo Carneiro et al: "Pruning Local Feature Correspondences Using Shape Context" 17th International Conference on (ICPR 2004) vol. 3, pp. 16-19, IEEE Computer Society Washington D.C., USA Aug. 2004, Print ISBN: 0-7695-2128-2. XP010724590.

Eric Mortensen et al: "A SIFT Descriptor with Global Context" Computer Vision and Pattern Recognition, 2005. CVPR 2005. IEEE Computer Society Conference on Jun. 20-25, 2005, vol. 1, pp. 184-190 vol. 1 ISSN 1063-6919, XP010817430.

Hongli Deng et al: "Reinforcement Matching Using Region Context" Computer Vision and Pattern Recognition Workshop, 2006. CVPRW '06. Conference on Jun. 17-22, 2006, pp. 11-11 Print ISBN: 0-7695-2646-2. XP010922749.

Gustavo Carneiro et al: "Flexible Spatial Configuration of Local Image Features" IEEE, Transactions on Pattern Analysis and Machine Intelligence, vol. 29, No. 12, pp. 2089-2104, Dec. 2007, XP011195554.

PCT/NL2009/050794 International Search Report, mailed Jan. 22, 2010.

\* cited by examiner

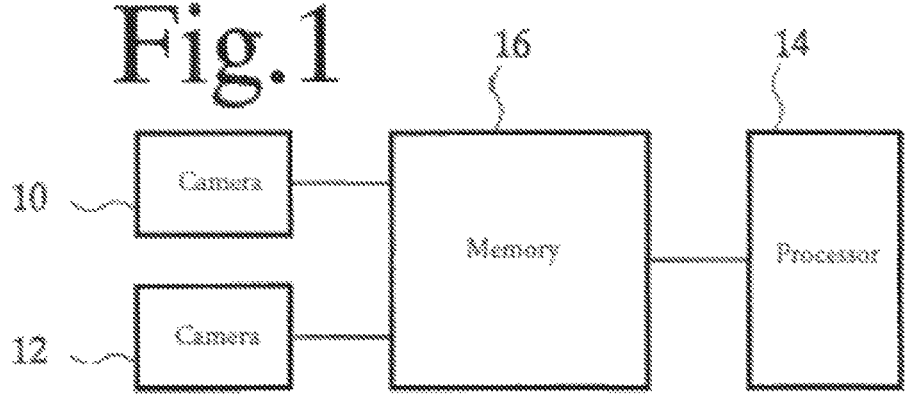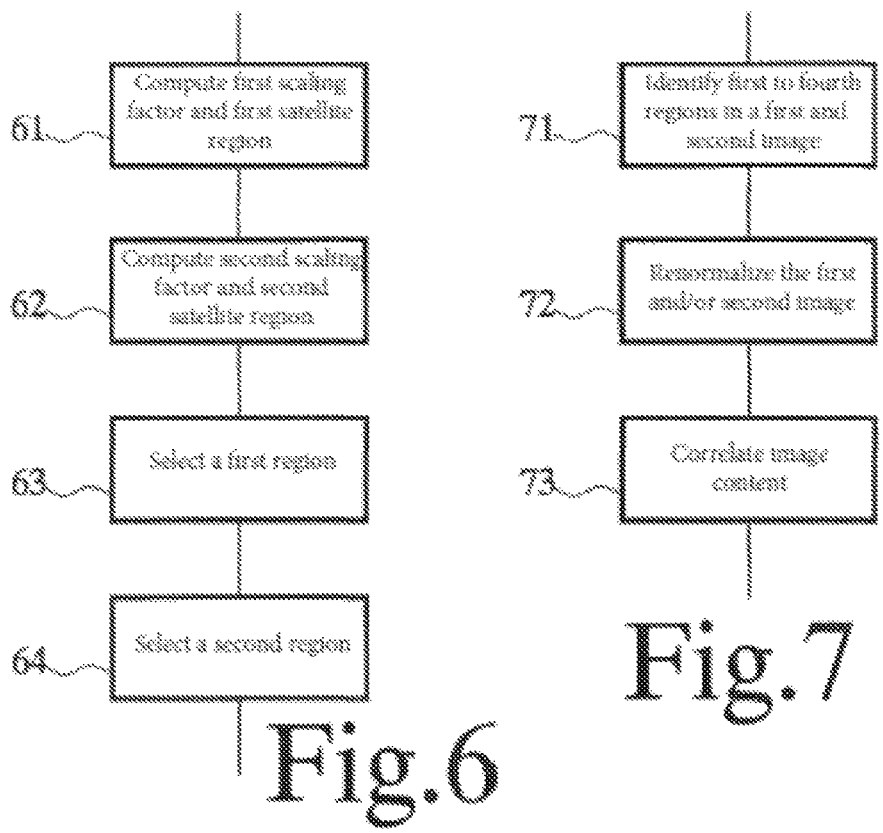

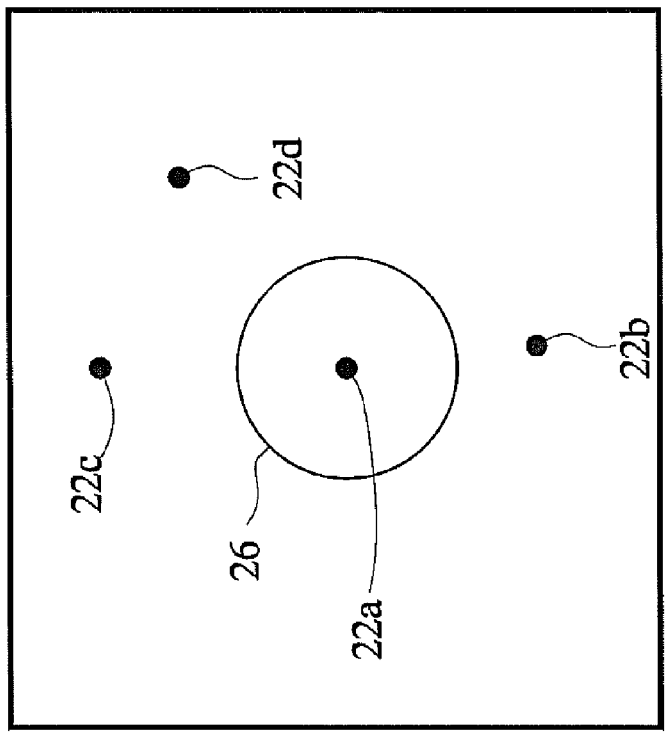
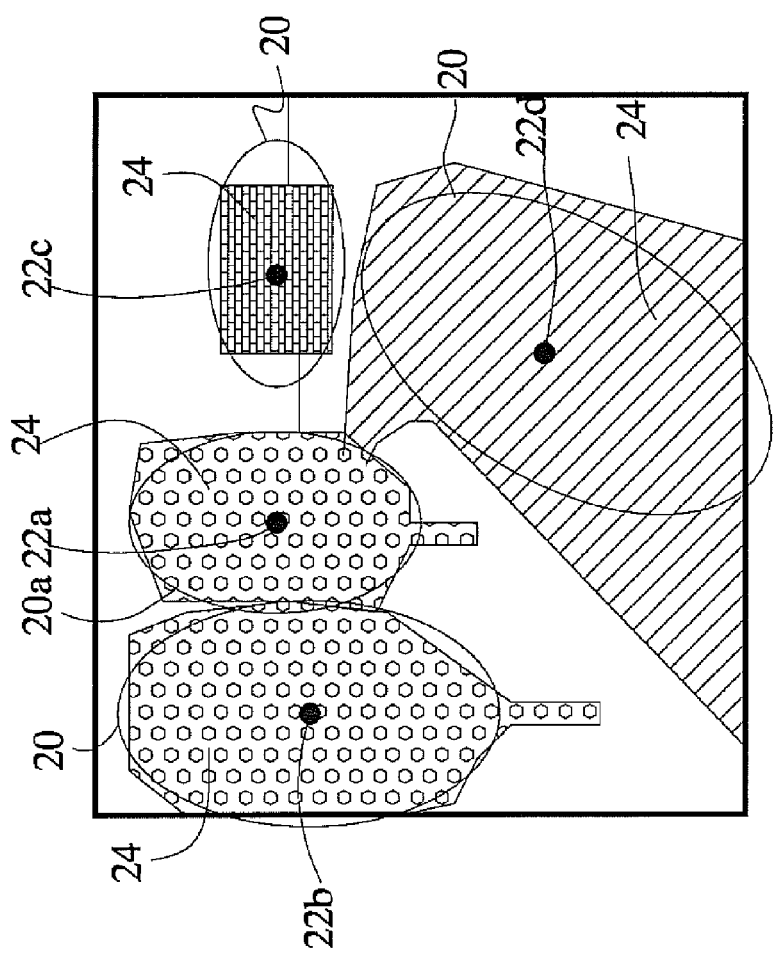

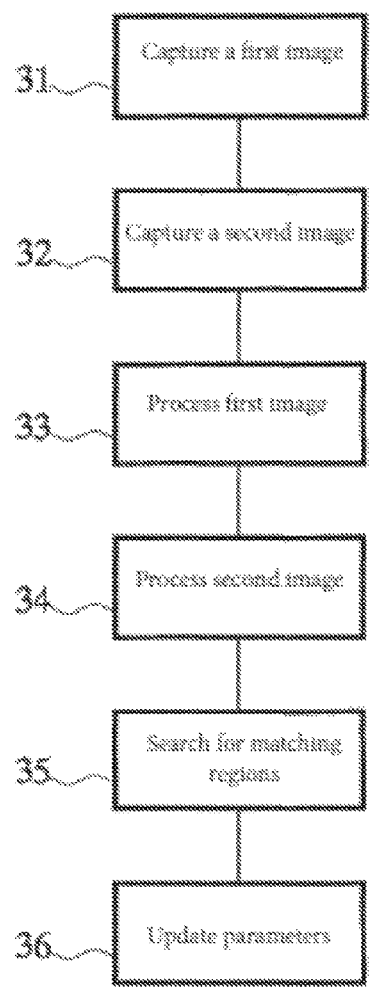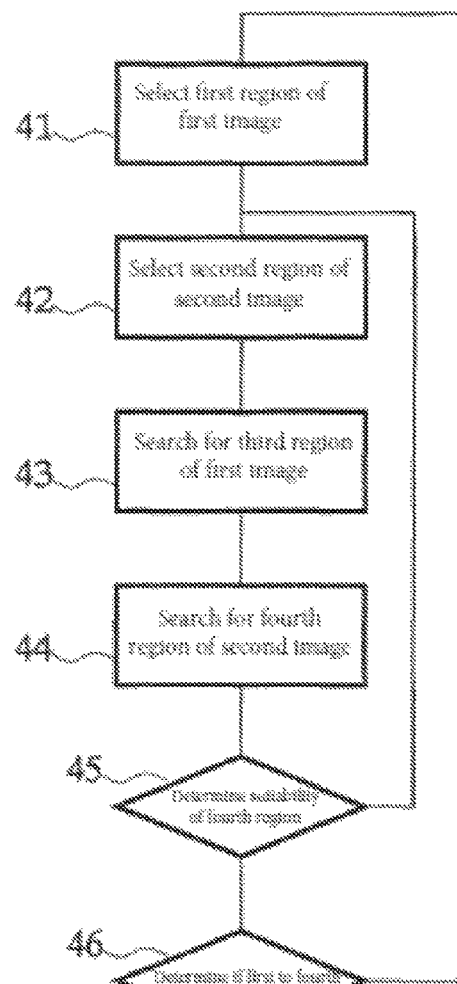
Fig.3
Fig.4

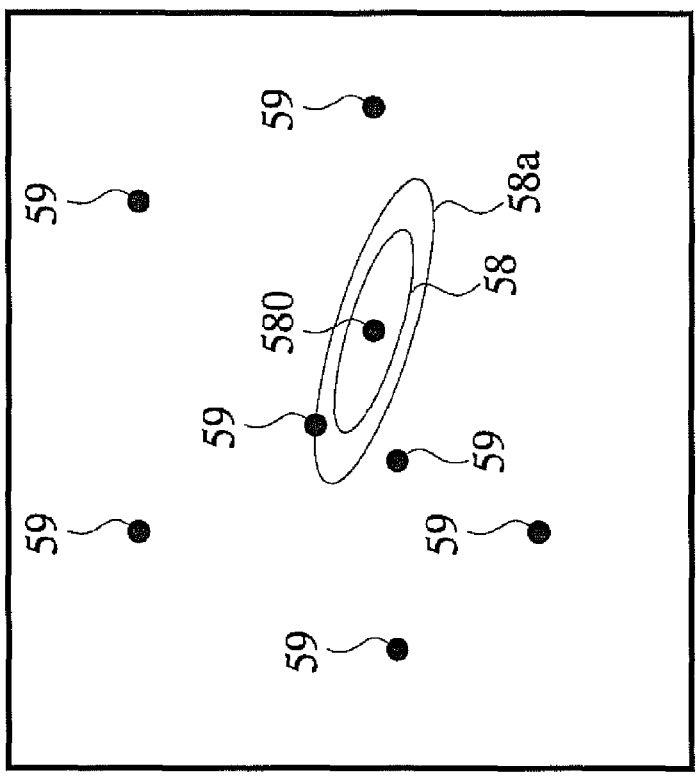
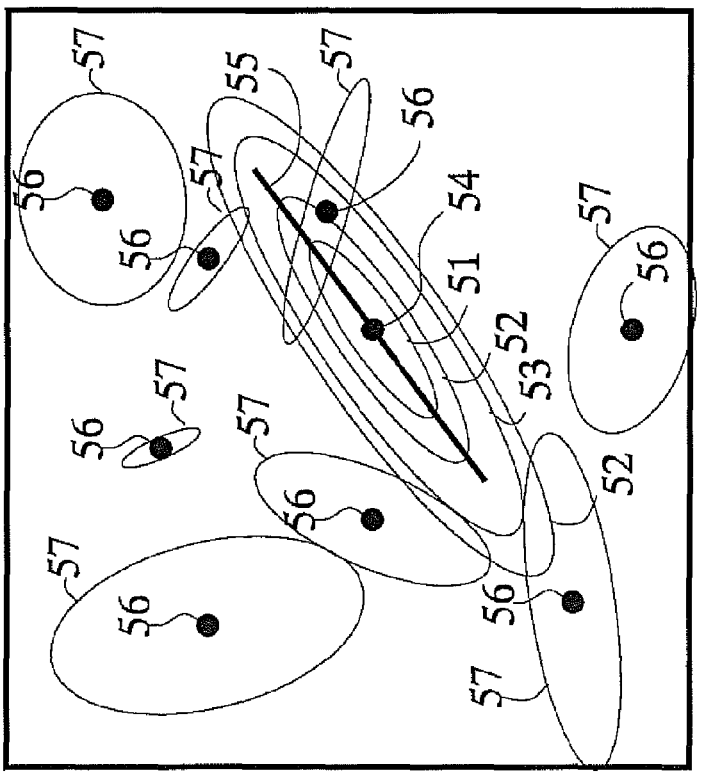
Fig.5

METHOD AND APPARATUS FOR IDENTIFYING COMBINATIONS OF MATCHING REGIONS IN IMAGES

FIELD OF THE INVENTION

The invention relates to an image feature matching apparatus and an image feature matching method.

BACKGROUND

The detection of correspondences between regions in different images is important in many image processing applications. The search for such corresponding regions can be simplified by use of invariant or covariant region properties, that is, detected properties that transform in a known way under viewpoint changes. An invariant measure of salience can be used for example to ensure that substantially the same, most salient regions from different images will be used. Such an invariant measure of salience is described in an article by E. Ranguelova et al, titled "Morphology-based Stable Salient Regions Detector" and published at the International conference on Image and Vision Computing New Zealand (IVCNZ '06), 2006, pp. 97-102 (EPO reference XP-002540172). The article proposes to compute a measure of "salience" that has been found to approximate human perception of salient image features. In addition to salience, each region is characterized by its moments, which can be considered to define a central position and an ellipse around that position that forms a first order approximation for the shape of the region. Under the assumption that the effect of viewpoint changes can be approximated by affine transformations, the effect of viewpoint changes on the moments is well defined.

The resulting region descriptors of regions in a first and second image can be used to search for corresponding regions from the first and second image. Regions having sufficient salience in both images and moments that match but for an affine transformation can be identified as corresponding regions. However, this type of matching does not account for the context of the identified regions. When attempts are made to use the context, the invariance property is usually lost, so that context sensitive matching is not robust against viewpoint changes.

A method of image feature matching is disclosed in an article by HongLi Deng et al, titled "Reinforcement Matching Using Region Context", published in at the conference on Computer Vision and Pattern Recognition 2006, New York, June 2006 pages 1-8 (EPO reference XP010922749). HongLi Deng et al disclose a method to compute match scores between detected regions in pairs of images. Regions are detected and for the detected regions ellipses are defined oriented along the dominant gradient orientation of the regions. The spatial context of the region is normalized using a moments matrix. Next surrounding matching regions in the context of the region are counted by binning, using bins defined in terms of the normalized context. A count is made of matching surrounding regions from contexts of a pair of matched regions. This count of surrounding regions is used to reinforce the match scores for the regions that define the context themselves. Thus, Hongli Deng et al look for matches with all regions anywhere in the context of a region. When a region in a context in one image cannot be matched to a region in a corresponding context in the other image, this does not reinforce the match, but otherwise it has no effect.

SUMMARY

Among others it is an object to provide for context sensitive matching of image regions in different images that is robust against viewpoint changes.

A method according to claim 1 is provided for. Herein use is made of image regions that have been identified in a first and second image. A search is made for first and second potentially matching regions in the first and second image that have third and fourth matching regions nearby in those images. First and second geometrical parameters characterizing shapes of the first and second region, such as moments, are computed. These geometrical parameters define first and second normalizing maps that map the first and second regions to isotropic regions respectively, i.e. regions with equal sized major and minor axes. A search is made for third and fourth regions closest to the first and second region in the normalized map. That is, closest regions are selected according to a redefined distance, as defined by the normalizing maps. It is verified whether the third and fourth regions are at equal distances for the first and second regions in spaces that are obtainable by mapping locations in the first and second image according to the first and second normalizing maps. By verifying the match only when there are such matching closest regions according to the redefined distance, an invariant form of negative matching is realized that excludes matches in the case of additional unmatched closer regions.

This verification may comprise actual mapping to these spaces, but alternatively a more direct comparison may be used. When the geometric parameters define ellipses for the first and second region for example, it may be verified whether the third and fourth regions are on scaled versions of the ellipses for the first and second region with matching scaling factors. In an embodiment, matching of sums of squares of normalized projections of connecting vectors onto a major and minor axis of the regions may be used. Herein a normalize projection onto an axis may be the scalar product of a reference vector along the axis, divided by the size of the reference vector. In this way a simple method of searching can be realized. In an embodiment, the sums of squares may be computed before the matching regions are selected.

In an embodiment matching scores for pairs of regions from the first and second set may be computed. These matching scores may be used to select regions for matching, for example by using only a predetermined number of highest ranking pairs according to the matching scores. In a further embodiment the matching scores of a pair of regions may be updated when the pair contains the first and second region and/or when the pair contains the third and fourth region found in said searching step. Thus, matches with high matching scores may be obtained indirectly when neighboring pairs of matching regions are detected.

In an embodiment matching of further parameters of the regions is used to modify the matching scores. Parameters may be used that are independent of viewpoint, or alternatively parameters may be used that depend on viewpoint in a known way, in which case these parameters may be transformed according to the normalizing maps of the regions before matching. Thus the reliability of matching may be increased.

BRIEF DESCRIPTION OF THE DRAWING

These and other objects and advantageous aspects will become apparent from a description of exemplary embodiments, using the following figures.

FIG. 1 shows an image processing apparatus
FIG. 2 shows examples of images with matching regions
FIG. 3 shows a flow-chart of an image matching process
FIG. 4 shows a flow-chart of part of an image matching process
FIG. 5 shows an example of scaled ellipses FIG. 6 shows a flow-chart of part of an image matching process FIG. 7 shows an embodiment wherein a new matching score is computed

DETAILED DESCRIPTION OF EXEMPLARY EMBODIMENTS

FIG. 1 shows an example of an image processing apparatus comprising a first and second camera 10, 12, a processor 14 and a memory 16. First and second camera 10, 12 and processor 14 are coupled to memory 16. In operation first and second camera 10, 12 capture digital data representing images of a scene that is viewed by both cameras and store the digital data in memory 16. For brevity the digital data from the first and second camera will be referred to as the first and second image. Although an example with two cameras 10, 12 is shown, it should be appreciated that instead one camera may be used, which is moved between the capture of the first and second image. Subsequently processor 14 processes the first and second image to identify regions in the first and second image. Processor 14 then searches for pairs of matching regions in the first and second image so that each pair may be attributed to an object in the scene. A search is made for spatial combinations of neighboring matching pairs, in order to increase the confidence that that each pair relates to the same object. The identification of pairs of image regions that can be attributed to the same object may be used in the determination of distance to the object, in image recognition, image compression etc.

FIG. 2 shows an image with a number of image regions 24. Each region 24 comprises a respective set of pixel locations. Typically, the pixel values within a region 24 have homogeneous properties. Parameters that characterize first order approximations of their shape can be assigned to the STOP regions. In the figure these parameters are symbolized by ellipses 20, 20a for the regions, each ellipse being characterized by a central location 22a-d, and major and minor axes with a certain direction and size. The central location and the direction and size of the axes represent the parameters. When the sizes of the axes are equal the region is said to be isotropic. It should be emphasized that the ellipses 20, 20a are shown only as a visual representation of the parameters that characterize first order shape approximations. It is not required that the underlying regions 24 actually have elliptic shape, nor are the ellipses boundary representations of the underlying regions 24.

Each image depends on the position and orientation of the camera relative to the scene, when the camera is used to capture the image. This position and orientation of the camera will be collectively referred to as the viewpoint. In images with different viewpoints, the same regions 24 may still be visible, but their geometric properties may change. An object in the scene may result in a region 24 that widens or flattens due to perspective changes. The size of regions 24 may change when the distance to the object changes. The orientation of a region may change when the camera is rotated. These image changes are reflected by changes in the numbers that characterize the first order shape approximations of the regions, represented by the ellipses 20, 20a in FIG. 2.

These effects of viewpoint changes can make it more difficult to find pairs of matching regions in different images. For individual regions it is known to reduce this problem by matching only invariant properties of regions, i.e. properties that do not change as a result of viewpoint changes, or do not change at least in a first order of an approximation of the effects of viewpoint changes. But the effects of viewpoint changes also make it difficult to search for matching spatial combinations of regions, because viewpoint changes can affect the spatial relations between regions in the images: the spatial relation is not invariant under viewpoint changes.

To address this problem, it is proposed to perform matching of combinations of neighboring regions in different images in accordance with local transformation of at least one of the images. This may be understood in terms of normalized constellations of ellipses, as will be explained in the following.

From the parameters that characterize the shape of a region a normalizing affine map can be derived that maps the representative ellipse onto a unit circle, i.e. the normalizing affine map is a map that makes the region isotropic. Basically, the normalizing affine map involves a translation of the ellipse 20a for that region that maps its central location to a reference point, followed by a rotation that maps the direction of its major axis onto a reference direction and finally scaling transformations that map the sizes of the major and minor axes of the ellipse onto unit radii of the unit circle.

FIG. 2a illustrates the effect of such a normalizing map onto a unit circle 26 for one of the regions in the image of FIG. 2. The normalizing map of a region in an image may be used to map the central locations 22c-d of other ellipses 20 in that image. When a first region in a first image and a second region in a second image are potentially matching regions, the normalizing maps of the first and second region may be used to map the central locations 22c-d of other ellipses in the first and second image respectively. This results in two constellations of mapped central locations 22c-d, for the first and second image respectively. An example of mapped locations is shown in FIG. 2a. Each mapped central location 22c-d has its own distance to the origin, i.e. to the central location 22a of the first or second region as appropriate.

By verifying whether there are pairs of central locations of third and fourth regions in the first and second image, with matching distances in the different constellations, a substantially invariant way of obtaining matching regions is obtained. Over a wide range the geometrical effect of viewpoint changes on images can be approximated by affine transformations. The affine transformation will have at least some validity as image maps also outside the relevant regions and that the map of the central locations of ellipses of other regions can be used for matching. This makes is possible to search for combinations of regions with a matching process that is substantially robust for the effect of viewpoint changes. When the verification shows no such third and fourth regions, the match of the first and second region may be discarded and a next pair of first and second regions may be considered.

It should be appreciated that the preceding explanation of mapping using constellations is primarily intended to explain the concept of invariant matching. Although this type of matching may be implemented using the normalizing affine maps, many other implementations are possible. For example, the distances that can be obtained in the normalized maps can also be computed more directly by computing a sum of squares $X^2+(eY)^2$ of coordinates X, Y of a central location 22b-d of an ellipse in a coordinate system with the first or second region at the origin with the major axis of the first or second region as unit vector in the X direction, wherein e is the ratio of the sizes of the major and minor axes of the first or second region. A comparison of these sums of squares for the third and fourth region, computed relative to the first and second region respectively, may be used to test for matching distances.

Equivalently, for an investigated ellipse (the third of fourth ellipse) relative to a reference ellipse (the first or second ellipse) $X^2$ is the normalized square size $(R*Ma)^2/Ma^2$ of the orthogonal projection of a vector R from the central location of the reference ellipse to the central location of the investigated ellipse, onto the major axis Ma of the reference ellipse and $(eY)^2$ is the normalized square size $(R*Mi)^2/Mi^2$ of the orthogonal projection of the vector R onto the minor axis Mi of the reference ellipse.

FIG. 3 shows a flow-chart of an image matching process. In a first step 31, camera 10 captures a first image of a scene from a first viewpoint. In a second step 32 camera 10 or 12 captures a second image of the scene from a second viewpoint. Although first and second step 31, 32 are shown as sequential, they may in fact be performed at unrelated time points or simultaneously.

In a third and fourth step 33, 34, processor 14 processes the first and second image respectively. Processor 14 identifies regions 24, 26 of pixel locations. For each identified region 24, 26, processor 14 computes descriptive parameters. The method of identifying the regions 24, 26 and computing the descriptive parameters is not critical. Region identification may involve selecting a set of locations of pixels that belong to a region, and verifying whether the pixel values and the locations meet a condition for qualifying the set as a region. A salience threshold may be applied for example, by computing a respective measure of salience for each region and selecting only regions for which the measure of salience exceeds a threshold. Examples of methods to determine a measure of salience for an image region are described in the proceedings of the International conference on Image and Vision Computing New Zealand (IVCNZ '06), 2006, pp. 97-102.

The salience of a region may be measured for example as a measure of distinction between the image contents of the region and another region that entirely surrounds it, or of versions of the region that are shrunken or grown by a predetermined amount. A region may be detected as salient for example if it has at least a predetermined size and its pixels have values (e.g. grey values or binary values obtained by thresholding) from one range of values and the pixels of a region that entirely surrounds it have values from a different, non overlapping range of values, or if shrinking or growing the region by a predetermined amount results in such a situation. The ranges may be defined for example by dividing the entire range of possible pixel values into two parts at a threshold level. The salience of a region may be measured for example from the size of the range of threshold values for which the region will be found to have this property, i.e. the difference between the minimum pixel value in the region and the maximum pixel value in the region that entirely surrounds it, or the difference between the minimum and maximum pixel values of these regions respectively. Instead of minima and maxima values of predetermined ranks may be used, e.g. a value that is lower than a fraction (e.g. 95%) of the pixel values in the region and a value that is higher than a fraction (e.g.) 95% of the pixel values in the region. Other measures of the distinction between a region and another region that entirely surrounds it may be used to measure salience.

In this way a collection of regions may be obtained that covers sets of pixel locations without necessarily covering the entire image. The computed descriptive parameters include at least parameters that represent the location, eccentricity (ratio between the size of it major and minor diameter) and direction of the main axis of an ellipse associated with the region.

In a fifth step 35, processor 14 searches for matching first and second regions in the first and second image. In a sixth step 36, the parameters of regions involved in the match may be updated, after which the process may be repeated from fifth step 35, for example to search for other matching first and second regions in the first and second image.

FIG. 4 illustrates an embodiment of the search process of fifth step 35. In a first step 41, processor 14 selects a first one of the identified regions in the first image. In a second step 42, processor 14 selects a second one of the identified regions in the second image. In a third step 43, processor 14 searches the first image for a third region.

FIG. 5 illustrates this search. A family of ellipses 51, 52, 53 is shown for a first region 50 in the first image. The different ellipses 51, 52, 53 are all scaled versions of the same basic ellipse 51 for first region. The parameters for the first region define a shared central location 54 of the ellipses in the family, the common direction of their main axes 55 and their common eccentricity. The different ellipses 51, 52, 53 of the family differ by the size of their diameter along the main axis.

In addition, the figure shows the central locations 56 of ellipses 57 for other regions in the same image. As can be seen, these central locations are outside of part the ellipses of the family of ellipses 51, 52, 53 for first region 50. The basic ellipse 51 for first region 50 has to be scaled by a certain minimum scaling factor before an ellipse 53 from the family is obtained with a boundary that crosses a central location 56 of an ellipse 57 for another region.

In addition the figure shows a second image with an ellipse 58 with a central location 580 for the second region. Furthermore, a scaled version 58a of that ellipse is shown. The figure also shows scaled central locations 59 of ellipses for other regions in the second image.

In third step 43, processor 14 searches the first image for a third region with its central location on the smallest scaled version of the ellipse for the first region 50 and determines a scaling factor needed to scale the ellipse 51 for the first region to obtain an ellipse 53 with the third region is at its boundary. This scaling factor may be represented (through its square) by a sum of squares $X^2+(eY)^2$ of coordinates X, Y of the central location of the third ellipse in a coordinate system with the first region at the origin with the major axis of the first ellipse as unit vector in the X direction, wherein e is the ratio of the sizes of the major and minor axes of the first region.

In a fourth step 44, processor 14 searches the second image for a fourth region with an ellipse that has a central location 59 that matches a position on the boundary of an ellipse 58a for the second region, the ellipse 58a being obtained by scaling the basic ellipse 58 for the second region by the scaling factor obtained in third step 43. Matching of the size may be tested for example by computing a sum of squares $X'^2+(e'Y')^2$ of coordinates X', Y' of the central location of the fourth ellipse in a coordinate system with the second region at the origin with the major axis of the second ellipse as unit vector in the X direction, wherein e is the ratio of the sizes of the major and minor axes of the second region. A test may be performed whether the sums of squares for the third and fourth regions match.

In this way, the ratio of the size of the scale ellipse 58a to the basic ellipse 58 for the selected second region in the second image matches the ratio between the size of the scaled ellipse 53 to the size of the basic ellipse 51 for the selected first region in the first image. Thus, effectively one member of a family of ellipses 58, 58a in the second image similar to the family in the first image is considered.

Although the figure illustrates an example where the central location of the ellipse of the fourth region is exactly at the boundary of the scaled ellipse 58a of the second region, it should be appreciated that in practice preferably no exact equality is required. Matching may account for a margin of error. In an embodiment a further scaling factor, or its square, may be considered, determined to realize an ellipse 58a that has the central location 59 of the ellipse of the fourth region at its boundary. This further scaling factor obtained from the second and fourth regions should equal the scaling factor obtained for the first and third regions, within the margin of error. In an embodiment, the ratio of this further scaling factor and the scaling factor from third step 43, or their squares, may be determined and the central location of the fourth region may be determined to be substantially at the boundary when the ratio differs from one by no more than a threshold value or a threshold factor.

In a fifth step 45, processor 14 determines whether a suitable fourth region has been found. If not, the process may be repeated from second step 42, selecting another second region from the second image. If a suitable fourth region is found, or not other region can be selected, a sixth step 46 is executed, wherein it is determined whether first to fourth regions have been found. If not, the process may be repeated from first step 41, selecting another first region from the first image. In an embodiment the process is repeated from first step 41 in any case, in order to produce a set of different matches even when first to fourth regions have been found. Optionally, a maximum allowable scaling factor may be imposed in third step 43, in which case fourth step 44 and fifth step 45 may be skipped when no third region can be found for sufficiently low scaling factors.

It should be appreciated that the results of this method of searching are substantially invariant for viewpoint changes, because it uses only the geometric properties of the ellipses for testing aspects of the relative geometrical configuration of different regions.

In an embodiment processor 14 performs third step 43 of the process of FIG. 4 using for the third region only the region requiring the lowest scaling factor for the ellipse of the first region in the first image. Thus a kind of negative matching is performed: when no match is found for the region that requires the lowest scaling factor, matching with regions with high scaling factors is blocked. This increases the reliability of matches. In another embodiment, no such block is used, and a search is made for possible third regions at higher scaling factors. This reduces the risk of missing matches.

In an embodiment, a similar negative criterion may be applied to selection the fourth region. In this embodiment, selection of a region as the fourth region in fourth step 44 is blocked if the second image contains a region at the boundary of a scaled ellipse of the second region with a scaling factor that is substantially less than the scaling factor from third step 43. This increases the reliability of matches. In another embodiment, no such block is used. This reduces the risk of missing matches.

In a further embodiment, when suitable third and fourth regions have been found, a follow-on search may be performed involving further third and fourth regions beyond the third and fourth regions requiring the lowest scaling factors for the ellipses of the first and second region. This can be done with steps similar to third step 43 and fourth step 44.

In addition to the conditions on locations, additional conditions may be imposed to match the first and second region in second step 42 and/or to match the third and fourth region in fourth step 44. In an embodiment, this matching may involve comparing descriptive parameters that have been determined for the regions, and selecting a second region or a fourth region as matching candidates for the first or the third region only when its descriptive parameters differ by no more than a threshold from those of the first and third region respectively. In this embodiment, use is preferably made of descriptive parameters that are expected to be substantially invariant under viewpoint changes. Dependent on the type of scene, such descriptive parameters may include statistical properties such as pixel value variance, or power densities in selected spatial frequency ranges, average hue etc.

Returning to FIG. 3, it may be noted that various use can be made of the results of fifth step 35. In one embodiment processor 14 maintains a collection of "matches", each match relating a respective pair of a first and second region in the first and second image respectively. For each match a match score may be kept indicating the quality of the score. Processor 14 may compute an initial matching score from a comparison of the descriptive parameters of the regions involved in the match. Selection of initial matches and computation of initial matching scores may be performed in an additional step (not shown) before fifth step 35. Subsequently, processor 14 may increase the matching score of a match in sixth step 36 when it is found that the regions in the match figure as first and second regions or as third and fourth regions in the result of the process of FIG. 4. Thus, although initially a matching score for two regions may be low, it may increase by support from other regions if the two regions are identified as third and fourth regions.

When the matching scores are updated, an iterative process may be used wherein the search of fifth step 35 is repeated, each time with updated matching scores. In this way use can be made of increased confidence in matches due to their spatial relation to other matches.

The initial and/or updated matches and their matching scores may be used to guide the selection of the first and second region in the first and second step of the process of FIG. 4, only first and second regions from matches with a matching score above a threshold being chosen. Similarly, presence of a third and fourth region in a match and a matching score above a threshold value may be used as an additional condition for selecting the third and fourth region in the process of FIG. 4. In the embodiment wherein only neighbors with lowest scaling factors are accepted as matched, the absence of a match for the lowest scaling factor neighbor may effectively be used to affect matching score updates.

In an embodiment processor 14 maintains a ranking of matches and/or a ranking of regions. Matches may be ranked according to matching score. Initially, regions may be ranked according to a measure of saliency for example, or according to any other computed characteristic value. Use of a measure of salience has been found to increase reliability and speed up searching.

In an implementation of the embodiment wherein a ranking of matches and/or a ranking of regions is used, processor may use only the matches and/or regions in the search of fifth step 35 when they have a rank indicating a better score that the score at a predetermined position in the ranking. In an iterative process, the ranks may be changed based on updates of the matching scores as a result of sixth step 36. Thus for example only the best ranking match or region may be used to select the first and second region in the search of fifth step 35, until this best ranking match or region is removed, after which the next best ranking match of region may be used in subsequent iteration and so on. Alternatively, only a predetermined number (e.g. ten) best ranking matches or regions may be used in this way.

In another embodiment, processor 14 may build data representing a network of related matches. A relation between a pair of matches may be entered in the network when the regions of the related matches have been found as first and second regions and third and fourth regions in the process of FIG. 4.

When a search is performed for a plurality of matching neighbors for the first and second region, this is preferably is combined with the embodiment wherein a ranking of matches and/or regions is used. In this way a strong match for a first and second region can be used to reinforce a plurality of further matches.

As mentioned, third step 43 of the process of FIG. 4 may involve a threshold scale factor, beyond which no search is made for third regions. In an embodiment, successive iterations of fifth step 35 and sixth step 36 of the process of FIG. 3 may be performed with increasing threshold scale factors.

As mentioned the selection of the method of identifying the regions 24 and computing the descriptive parameters is not critical. In a simple example of an embodiment, region identification involves comparing pixel values with a threshold and collecting a connected set of pixels that all have pixel values on the same side of the threshold (connected means that for any pair of pixels in the set, the set also contains a path between the two pixels entirely through pixels of the set, always with steps between neighboring pixels). In this embodiment the pixel values may be taken directly from the image, or they may be obtained by pre-processing the image, for example by filtering, or determining variance values with or without prior filtering.

Additional verification that a set of pixel locations qualifies as a region may involve computing a characteristic value from the pixel values and/or an outline shape of the set of pixel locations and/or its surroundings. A measure of salience may be used for example. When a characteristic value is used, a region may be identified if the characteristic value exceeds a threshold and/or a predetermined number of sets with the highest characteristic values may be selected.

FIG. 6 shows an example of an alternative to the process of FIG. 4, wherein scaling factors are computed before matching. In a first step 61, processor 14 computes a respective first scaling factor and first satellite region for each identified region in the first image, needed to scale the ellipse 51 of the region to a smallest ellipse 53 with a central location of another region in the first image at its boundary. In this case the satellite of the first region is selected to be this other region. In a second step 62, processor 14 does the same for a second image to obtain second scaling factors and second satellite regions. In a third step 63, processor 14 selects a first region and in a fourth step 64 processor 14 selects a second region subject to the condition that its second scaling factor corresponds to the first scaling factor for the first region. In this case the satellite regions of the first and second region will be the third and fourth regions. The process may be repeated from third step 63 to find more matches between other first and second regions, or from fourth step to find more regions that can be matched with the same first region.

FIG. 7 shows an embodiment wherein a new matching score is computed (or the previous matching score may be updated). In a first step 71, processor 14 identifies first to fourth regions in a first and second image, using for example steps from the process of FIG. 4 or 6. In a second step 72, processor 14 renormalizes the first and/or second image in local image parts that include the position of the first to fourth region. The renormalization may be performed by means of one or more affine transformations that map pixel locations.

A single mapping may used, corresponding to the mapping of the ellipse for the first region onto the ellipse for the second region or vice versa, for example a composition of the normalizing map of the first region and an inverse of the normalizing map of the second region. This transformation may involve a combination of a scaling that equalizes the size of the major axes of the ellipses, stretching or compression in the direction perpendicular to the major axis that equalizes the eccentricities and a rotation that aligns the directions of the main axes. Alternatively, two mappings of pixel locations may be used, corresponding to mapping of the ellipses of the first and second region onto a same reference ellipse (for example onto a unit circle).

In a third step 73, processor correlates image content of the first and second image using the renormalized image parts. A resulting correlation score for image areas containing the first and second regions may be used to determine the matching score for the match of the first and second region. Methods of computing matching scores from correlations are known per se.

Instead of pixel mapping and comparison, mapping and comparison may be applied to other parameters that have a known dependence on viewpoint changes. Examples of such parameters may be power densities at selected spatial frequencies (obtained for example by taking a Fourier transform of pixel values in an image region and taking its absolute square), or correlation coefficients between pixels in the regions at different relative distances. The rotation and scaling parts of the maps affect known rotation and scaling of the Fourier coefficients for example. In this embodiment, the method comprises a step of computing such image parameters from pixel values in the first image and in the second image, transforming the parameters from at least one of the images with a mapping that corresponds to the mapping of the ellipse (e.g. by mapping spatial frequencies) and comparing the results.

Optionally, the mapping obtained for the first and second region may be used to compare pixel value or parameters of the third and fourth region as well. In an embodiment, an affine transformation may be used that maps the ellipse for the third region onto the ellipse for the third region or vice versa. Correlation score for image areas containing the third and fourth regions may be used to determine the matching score for the match of the third and fourth region.

The descriptive parameters of each region 24 may be computed from coordinates of pixels in the region and/or image content of those pixels. Optionally, use may be made of properties of image areas that are adjacent to the region for which the descriptive parameters are computed. The computed descriptive parameters include parameters that represent the location, eccentricity and direction of the main axis of an ellipse associated with the region. In en embodiment such parameters may be extracted by computing moments of the regions, i.e. by computing sums of powers of pixel coordinates, summed over pixel locations in the regions. The relation of such moments to parameters of an ellipse is known per se.

As is known per se, matches between image regions may be used for various purposes. For example, in a stereoscopy system, they may be used to determine distance to the scene part that gave rise to the matching regions, from the positions of the matched regions. In other examples, the matches may be used for video compression or for construction video images from adaptable viewpoints. The matches may be used for object recognition. In a position determining system the matches may be used to determine the position of the camera in a landscape.

Processor 14 may be a programmable processor, programmed with a program of instructions to make it perform the steps of the processes described in relation to the figures. Although a single processor 14 has been shown, processor 14 may comprise a plurality of sub-processors for performing respective tasks, or for performing the same tasks in parallel. Instead of a programmable processor 14, or programmable sub-processors, circuits may be used that are designed specifically to perform tasks involved in the process.

The invention claimed is:

1. A method of identifying combinations of matching regions in a first and second image of a common scene, the method comprising
    identifying first and second sets of image regions in the first and second image respectively;
    selecting a first and second region from the first and second set respectively;
    computing first and second geometrical parameters characterizing shapes of the first and second region respectively, the first and second geometrical parameters defining a first and second normalizing map that map the first and second regions to isotropic regions respectively;
    searching for third and fourth regions in the first and second image with matching distances to the first and second regions in spaces obtainable by mapping locations in the first and second image according to the first and second normalizing maps respectively, the search for the third and fourth regions being limited to first and/or third regions from the first and second set that lie closest to the first and second region in said spaces respectively.

2. A method according to claim 1, comprising computing a measure of salience for each of the image regions and restricting the selection to first and second regions for which the measure of salience exceeds a threshold.

3. A method according to claim 2, wherein said restricting comprises restricting the selection from the first and second set to regions with a measure of salience that is exceeded by the measures of salience of no more than a pre-set number of regions in the first and second set respectively.

4. A method according to claim 1, comprising computing a first sum of squares of normalized projections of a vector from the first region to the third region onto a major and minor axis of the first region respectively, computing a second sum of squares of normalized projections of a vector from the second region to the fourth region onto a major and minor axis of the second region respectively, and testing whether the first and second sums match.

5. A method according to claim 1, comprising computing matching scores for pairs of regions from the first and second set and updating the matching score of a pair when the pair contains the first and second region and/or when the pair contains the third and fourth region found in said searching step.

6. A method according to claim 5, comprising ranking pairs of regions from the first and second set according to the matching scores of the pairs, applying said searching with first and second regions restricted to regions from a predetermined number of pairs with highest ranking matching scores and iteratively repeating said ranking and searching after the updates of the matching scores.

7. A method according to claim 1, comprising determining further parameters of the regions, comparing the further parameters of the first second region and/or comparing the further parameters of the third and fourth second region and computing a matching score from a result of said comparing.

8. A method according to claim 7, wherein said comparing comprises mapping the further parameters according to the first and second normalizing map.

9. An image processing apparatus, comprising
    an image input, for receiving a first and second image;
    a region detector coupled to the input and configured to select first and second sets of image regions with locations from the first and second image respectively;
    a matching module configured to select a first and second region from the first and second set respectively, to compute first and second geometrical parameters characterizing shapes of the first and second region respectively, the first and second geometrical parameters defining a first and second normalizing map that map the first and second regions to isotropic regions respectively, and to search for third and fourth regions in the first and second image with matching distances to the first and second regions in spaces obtainable by mapping locations in the first and second image according to the first and second normalizing maps respectively, the search for the third and fourth regions being limited to first and/or third regions from the first and second set that lie closest to the first and second region in said spaces respectively.

10. An image processing apparatus according to claim 9, wherein the matching module is configured to compute a first sum of squares of normalized projections of a vector from the first region to the third region onto a major and minor axis of the first region respectively, to compute a second sum of squares of normalized projections of a vector from the second region to the fourth region onto a major and minor axis of the second region respectively, and to test whether the first and second sums match.

11. An image processing apparatus according to claim 9, wherein the matching module is configured to compute matching scores for pairs of regions from the first and second set and updating the matching score of a pair when the pair contains the first and second region and/or when the pair contains the third and fourth region found in said searching step.

12. A non-transitory computer readable medium, comprising a program of instructions for a programmable computer that, when executed by the computer will cause the computer to perform the steps of the method of claim 1.

* * * * *

UNITED STATES PATENT AND TRADEMARK OFFICE
CERTIFICATE OF CORRECTION

PATENT NO.        : 8,655,080 B2
APPLICATION NO.   : 13/141372
DATED             : February 18, 2014
INVENTOR(S)       : Elena Boykova Ranguelova It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 408 days.

Signed and Sealed this

Twenty-ninth Day of September, 2015

Michelle K. Lee
*Director of the United States Patent and Trademark Office*